United States Patent

[11] 3,632,425

| [72] | Inventors | Paul R. Graham<br>Ballivin;<br>August F. Ottinger, St. Louis, both of Mo. |
|---|---|---|
| [21] | Appl. No. | 877,595 |
| [22] | Filed | Nov. 24, 1969 |
| [45] | Patented | Jan. 4, 1972 |
| [73] | Assignee | Monsanto Company<br>St. Louis, Mo.<br>Original application May 13, 1968, Ser. No. 728,783, now abandoned. Divided and this application Nov. 24, 1969, Ser. No. 877,595 |

[54] POLYMER MODIFIED STARCH COMPOSITIONS
10 Claims, No Drawings

[52] U.S. Cl. .................................................. 117/155 UA,
117/156
[51] Int. Cl. ........................................ D21h 1/40,
B32b 27/10
[50] Field of Search ........................................ 117/155,
161; 260/29.6, 80.73, 17.4

[56] References Cited
UNITED STATES PATENTS

| 2,914,498 | 11/1959 | Quarles et al. .................. | 260/29.6 |
|---|---|---|---|
| 2,945,775 | 7/1960 | Lehman et al. .................. | 117/155 |
| 3,108,017 | 10/1963 | Messwarb et al. ............. | 117/161 X |
| 3,265,654 | 8/1966 | Glabisch et al. ................ | 117/155 X |
| 3,297,618 | 1/1967 | Glabisch et al. ................ | 260/87.5 X |
| 3,347,811 | 10/1907 | Bissot ............................ | 117/155 X |
| 3,365,410 | 1/1968 | Wesslau et al. ................. | 117/155 X |
| 3,409,568 | 11/1968 | Holladay et al. ................ | 117/155 X |
| 3,380,851 | 4/1968 | Lindemann et al. ............. | 117/161 X |
| 3,428,582 | 2/1969 | Deex ............................... | 117/161 X |
| 3,437,626 | 4/1969 | Glabisch ......................... | 117/155 X |

*Primary Examiner*—William D. Martin
*Assistant Examiner*—M. R. Lusignan
*Attorneys*—Neal E. Willis, Arnold H. Cole and William H. Hellwege, Jr.

ABSTRACT: Ethylene/vinyl chloride interpolymers are used as starch modifiers to provide flexible tough films for fibrous substrates.

POLYMER MODIFIED STARCH COMPOSITIONS

This application is a division of copending application Ser. No. 728,783 filed May 13, 1968 and now abandoned.

This invention relates to the coating of fibrous substrates. More particularly this invention is concerned with coating compositions which provide an excellent barrier to solvents and oil when applied to fibrous substrates wherein the coating is a starch composition modified with an ethylene/vinyl chloride interpolymer.

In recent years there has been an increased demand for coated paper and paperboard displaying greater resistance to solvents, grease and wax. Such coatings on paper are required to provide excellent solvent and toner holdout in electrofax papers. Additional requirements provide for wax holdout for food and other packaging, grease resistant packaging and high-ink holdout printing papers.

Various types of starches have long been used as binders in pigmented paper coatings. The choice of starch for this use as a paper coating has been dictated by the low cost, good color, ease of application and lack of odor along with a reduced tendency towards foaming and spoilage as compared with proteinaceous binders such as casein.

Starch has major shortcomings as an adhesive in paper coatings. When the starch is used alone the coatings are not flexible and tend to rupture upon creasing or crumpling and therefore become permeable to solvents and oil. Many attempts have been made to improve the solvent and oil resistance of starch-based coatings through chemical modification or by admixture with starch plasticizers rather than to substitute other materials, principally because starch is easy to apply and is inexpensive in addition to the advantages noted. Polyvinyl acetate and styrene butadiene latexes used with starch for this purpose have been found to be either incompatible with starch or result in a brittle, weak film.

None of these approaches to provide satisfactory coatings have been fully successful.

In view of the state of the art, it has become highly desirable to provide modified starch compositions which are useful for coating fibrous substrates which provide excellent solvent and oil resistance.

It is accordingly an object of this invention to provide improved fibrous substrate coating compositions.

It is a further object of this invention to provide a composition which will enhance the solvent and oil resistance properties of the coated substrate.

Other objects and advantages of this invention will be apparent to those skilled in the art from the following detailed description and claims.

In accordance with this invention it has been found that the above and still further objects are achieved when a fibrous substrate is coated with a composition comprising starch and an ethylene/vinyl chloride interpolymer of the type hereinafter described.

The starch can be any of the natural starches or modified starches such as oxidized starches, enzyme converted starches, starch ethers and the like. Suitable starches include cornstarch, potato starch, wheat starch, rice starch, sago starch, high-amylaceous corn, soluble starch, chlorinated starch, tapioca starch, arrowroot starch, sorghum, waxy maize, hydroxyethyl starch and other commercially available starches.

The interpolymers which are used according to this invention generally contain from about 5 percent to about 70 percent ethylene, from about 30 to about 95 percent vinyl chloride, and from about 0.1 to about 10 percent of acrylamide. Part of the acrylamide in the interpolymer may be replaced by polar monomers such as acrylonitrile, N-(lower alkyl) acrylamide and N-(lower alkyl) methacrylamide containing from one to three carbon atoms in said lower alkyl groups, N-methylol acrylamide, N[2-(2-methyl-4-oxopentyl)] acrylamide, acrylic acid, methacrylic acid, and alkali metal and ammonium salts of acrylic and methacrylacrylic acids, maleic acid, fumaric acid, half and complete alkali metal and ammonium salts of maleic and fumaric acid, aconitic acid, itaconic acid, citraconic acid, and alkali metal and ammonium salts thereof, half alkyl ester of maleic, fumaric, itaconic and citraconic acids having from one to six carbon atoms in said alkyl groups, acrylyl and methacrylyl esters of hydroxyalkanoic acids having from two to about six carbon atoms in the alkanoic acid moieties, acrylylamides and methacrylylamides of aminoalkanoic acids having from two to about six carbons in the aminoalkanoic acid, hydroxyethyl and hydroxypropyl esters of acrylic, methacrylic, maleic, and fumaric acids, vinyl esters of alkanoic acids having from one to six carbon atoms such as vinyl acetate, vinyl propionate, and lower alkyl (one to six carbon atoms) sulfonic acid, vinyl esters of phenylsulfonic acids, and alkylphenylsulfonic acids and acrylyl and methacrylyl esters of hydroxyalkylsulfonic acids having from one to six carbon atoms in said alkyl moieties, and hydroxyalkylsulfonamides having from one to six carbon atoms in said hydroxyalkyl moieties. The acrylamide generally should constitute at least 50 percent by weight of the third or polar monomer of said interpolymer and preferably constitutes at least about 80 percent of said polar monomer.

Thus the interpolymers as prepared in aqueous dispersed form are at least copolymers containing ethylene and vinyl chloride. The interpolymers may also be terpolymers containing ethylene, vinyl chloride and acrylamide and may be a quaternary or higher polymers containing one or more of the above exemplified additional polar monomers in small quantities but generally such additional monomers will not be present in the interpolymer in quantities greater than about 2 percent by weight.

It is preferred that the interpolymer contain from about 5 percent to about 70 percent ethylene, 30 percent to about 95 percent vinyl chloride, and from about 1 percent to about 5 percent acrylamide. A specific example of choice, as presently understood, is a terpolymer containing from about 19 to 23 percent ethylene, about 74 to about 78 percent vinyl chloride, and from about 2 to about 4 percent acrylamide.

Although the interpolymers used in the practice of this invention are generally unmodified, the modified interpolymers are included for use in this invention. The interpolymers are particularly amenable to hydrolytic modification by the use of small quantities of a strongly alkaline material such as an alkali metal hydroxide, or a quaternary ammonium hydroxide such as tetramethyl ammonium hydroxide, or by a strong acid such as the mineral acids, e.g., hydrochloric, sulfuric, phosphoric, nitric. The base or acid used preferably has an ionization constant higher than $10^{-4}$ at 25° C.

The hydrolyzing treatment, performed with an acid or a base need not be performed to the same extent, especially if the interpolymer contains polar monomers in addition to the acrylamide. The aqueous dispersion or polymer latex of the ethylene, vinyl chloride, and acrylamide is generally treated with aqueous base or acid in an amount which is chemically equivalent to up to about 100 percent of the amide equivalent in the interpolymer.

Specific examples of polar monomers which may be used, as described above, to replace part of the acrylamide in the polymers of this invention include acrylonitrile, N-methacrylamide, N-ethylacrylamide, N-propylacrylamide, methacrylamide, acrylic, methacrylic, maleic, fumaric, itaconic, aconitic, and citraconic acids and alkali metal and ammonium salts of such acids, preferably the sodium, potassium or ammonium salts, alkyl esters of such acids, e.g., methyl acrylate, ethylacrylate, butyl acrylate, methyl methacrylate, butyl methacrylate, ethyl methacrylate, monoethyl maleate, dipropyl fumarate, acrylyl 3-hydroxypropionate, methacrylyl 4-hydroxybutanoate, N-acrylyl acetamide, N-methacrylyl hexamide, 2-hydroxyethyl and 2-hydroxypropyl esters of acrylic, methacrylic, maleic, fumaric, itaconic, aconitic, and citraconic acids, vinyl formate, vinyl acetate, vinyl hexanoate, vinyl and alkyl esters of propanesulfonic acid, vinyl phenylsulfonate, acrylyl and methacrylyl esters of 2-hydroxpropylsulfonic acid, and N-acrylyl and N-methacrylyl 2-hydroxypropanamides.

The foregoing ethylene/vinyl chloride interpolymers are readily prepared by various means known to the art. The ethylene/vinyl chloride copolymers used in this invention are preferably prepared by a process which comprises mixing the ethylene and vinyl chloride monomers in the presence of an alkaline buffered redox initiator-catalyst system, water and from about 1 percent to about 8 percent by weight based upon the monomer feed, and from about 4 percent to about 7 percent by weight based upon the polymer product, of a nonionic emulsifying agent having a HLB value (hydrophilic-lipophilic balance of an emulsifier) of from about 10 to about 17, and reacting the mixture at a temperature and pressure and for a time sufficient to cause polymerization of the monomers. Other suitable emulsifying agents include anionic emulsifiers having a HLB value of at least 10.

The ethylene, vinyl chloride, acrylamide interpolymers may be prepared by first mixing ethylene and vinyl chloride in an aqueous medium in the presence of any suitable anionic or nonionic emulsifier and any initiator capable of generating free radicals in the chemical mixture at the chosen reaction temperature and pressure. The acrylamide, preferably in aqueous solution either alone or mixed with the appropriate amounts of other polar monomers, is added to the polymerizing ethylene and vinyl chloride mixture gradually throughout the reaction. The addition of the acrylamide is preferably begun after about 40 to 50 percent of the desired conversion of the ethylene and vinyl chloride has been reached. A shell-core latex in which the polar monomer is concentrated in the outer layers is produced.

Examples of the interpolymer latices which can be used in the practice of this invention are shown in table I.

tice solutions may be applied over a wide temperature range normally practiced in the paper manufacturing industry.

The modified starches are applied to the fibrous substrates as aqueous dispersions. The concentrations of the compositions will of course vary widely with differing starches, base stocks, product specifications and other factors.

The fibrous substrates such as paper which may be coated according to this invention with the modified starch compositions to produce a product of enhanced barrier characteristics may contain from about 0.5 to 150 pounds of modified starch compositions on one side per ream. (A ream is 3,000 sq. ft. and equals 500 sheets, 24 inches by 36 inches.) Generally, however, about 1 to 20 pounds of modified starch composition is adequate while 1 to 5 pounds is all that is needed for many purposes.

The modifiers of the present invention increase the oil and solvent holdout of the starch film on fibrous substrates as much as a hundredfold. In contrast to previously known starch modifiers, the modifiers of this invention provide much greater oil and solvent holdout resistance while enhancing many of the other desirable properties of starch sized substrates. In fact, none of the advantageous characteristics of starch coated paper is adversely affected to a significant degree.

The fibrous substrates to which the compositions are applied in carrying out the present invention include papers of all types, such as bond writing paper, fibrous paperboards such as cardboard, chipboard, carton stock, glassine, parchment and the like, wrapping papers or boards, or liners for containers intended for the packaging of foods, greases, chewing gum, soap, soap powders, cosmetics, calking com-

TABLE I

| Polymer Example No. | Hydrolyzed | Percent VCl | Ethylene | Acrylamide | Sodium acrylate | Sodium methacrylate | Latex polymer solids | SLS |
|---|---|---|---|---|---|---|---|---|
| 1 | No | 76 | 21 | 3 | | | 47.0 | 1.5 |
| 2 | No | 74.9 | 25 | 0.50 | | | 47.3 | 0.9 |
| 3 | No | 70.5 | 27 | 2.36 | | | 45.7 | 1.79 |
| 4 | No | 74.0 | 25 | 1.48 | | | 48.1 | 1.40 |
| 5 | No | 72.2 | 27 | 0.65 | | | 47.7 | 2.06 |
| 6 | No | 72 | 18 | 3.0 | | | | |
| 7 | Yes | 76 | 21 | 3 | | | 49.0 | |
| 8 | Yes | 74.9 | 25 | 0.5 | | | 46.1 | |
| 9 | Yes | 70.5 | 27 | 2.36 | | | 44.2 | |
| 10 | Yes | 74.0 | 25 | 1.48 | | | 46.9 | |
| 11 | No | 76 | 21 | 2.3 | 0.7 | | 43 | 1.1 |
| 12 | No | 76 | 21 | 2.3 | | 0.7 | 43 | 1.1 |
| 13 | No | 70 | 30 | | | | 44 | |
| 14 | No | 74.8 | 25.2 | | | | 51.3 | |
| 15 | No | 70.5 | 29.5 | | | | 44.8 | |
| 16 | No | 75 | 25 | | | | 45.2 | |

Illustrative of other interpolymers which may also be employed in the compositions of this invention are ethylene/vinyl chloride/acrylamide hydroxyethylacrylate, ethylene/vinyl chloride/acrylamide/N-isopropylacrylamide, ethylene/vinyl chloride/acrylamide/N-ethylmethacrylamide, ethylene/vinyl chloride/acrylamide/diammonium itaconate, ethylene/vinyl chloride/acrylamide/monobutyl acid maleate and ethylene/vinyl chloride/acrylamide/N-methacrylyl-propionamide.

The modified starches are prepared in accordance with the present invention by mixing the starch with an interpolymer heretofore described. The interpolymer can constitute from about 5 to about 50 percent by weight of the starch composition. It is preferred, however, to employ compositions containing between about 10 percent and 30 percent of the interpolymer.

The interpolymer is generally blended with the starch after the starch has been cooked. For example, the starch-water mixture is cooked with agitation at about 90°–95° C. for approximately 15 minutes, then cooled to 60°–65° C. The interpolymer latex is then added to the starch slurry to provide a total solids content of the starch/interpolymer blend of from 1 to about 25 percent. A preferred total solids content of the blend ranges from about 5 to about 15 percent. The cooling is carried out only for laboratory control. In commercial pracpounds, etc. The coated papers may also be used as wallpapers, papers for lining drawers and shelves, especially in linen closets, kitchen cabinets and the like, and the coated paper or paperboards may be used as bookcovers or book pages. The compositions may be applied to provide solvent and toner holdout in electrofax paper and high-ink holdout in printing paper.

The processes for applying the interpolymer coating to the fibrous substrate are well known in the art. Such techniques include spraying, roller coating, air knife coating, trailing blade coating, curtain coater, and use of a Mayer rod (machine).

The coatings are then tested for various physical properties. The test procedures are hereinafter described and the results are listed in tables I, II and III.

The test methods used to determine the physical properties of the fibrous substrate coated with the modified starch compositions are listed below along with explanatory notes where necessary. Samples were conditioned according to TAPPI T402m–49 before testing. The paper base stock used in the testing hereinafter described is 50 pounds bleached Kraft.

Oil Resistance

Creased box test—A 6-inch × 6-inch coated one side specimen blank is folded diagonally from corner to corner, each fold is subjected to a 5 pound pressure. The blank is further folded 1 inch from each edge and then made up into a 4-inch × 4-inch box having 1-inch sidewalls with the coated surface inside. All creases, except those made by the sidewall folds converge as an apex in the center of the box bottom. Fifty cc. No. 10 SAE oil is poured into the box and the time required to penetrate the creased areas is noted.

Solvent Holdout

A coated paper is placed on a glass plate with the coated side up. A brass or glass tube 2 inches high and having a 1⅛-inch I.D. is placed in an upright position on the paper. One ml. of dyed toluene solution is poured into the tube and the stop watch is started. After 10 seconds the tube is slid off of the paper and the excess toluene removed. The number of penetrations are noted. Other solvents such as the Smith Corona (distillation range—first drop 182.5° C. to dry point 211.4° C.) Marchant (S.C.M.) microstatic dispersant may be used in place of toluene.

TABLE II.—COATING COMPOSITION PROPERTIES AND FILM CHARACTERISTICS

| Composition | Components | Total solids, percent | Percent plastifier | pH | Viscosity at 40° C., cps. | Film Properties |
|---|---|---|---|---|---|---|
| A | Starch [1] | 7.2 | 0 | 6.3 | 230.5 | Clear, flexible, low tear strength. |
| B | Starch [1]—styrene butadiene [2] | 7.2 | 20.0 | 6.7 | 241.5 | White, flexible, tough. |
| C | Starch [1]—polyvinyl acetate [3] | 7.2 | 20.0 | 5.1 | 81.5 | White, breaks on 180° bend, low tear strength. |
| D | Starch [1]—Interpolymer [4] E/VCl | 7.2 | 20.0 | 6.9 | 286.5 | Clear, flexible, tough. |

[1] Hydroxy ethylated corn starch—Penford Gum 260.
[2] Dow—620
[3] Monsanto Co. 3-840-N.
[4] Interpolymer of Example 1.

TABLE III.—SOLVENT HOLDOUT PROPERTIES

| | | No. of pinholes/1⅛" area in 10 sec. | |
|---|---|---|---|
| Composition | Coating wt., lb./3,000 ft.² | Toluene | S.C.M. microstatic dispersant |
| A | 2.5 | 15-13-21-18-18 | 13-9-15-9-8 |
| B | 2.5 | 8-10-3-9-5 | 10-5-9-6-8 |
| C | 2.7 | 13-6-5-16-20 | 24-28-20-18-21 |
| D | 3.4 | 6-3-5-3-6 | 4-3-3-4-2 |

NOTE.—All coatings—Tables III and IV—double coat, one side No. 6 rod and calendered.

TABLE IV.—OIL HOLDOUT PROPERTIES

| Composition | Coating wt., lbs./3,000 ft.² | Penetration Time, secs. | Type of failure |
|---|---|---|---|
| A | 2.5 | 22.5 | Along creases with considerable penetration in uncreased areas. |
| B | 2.5 | 36.5 | Along creases with some penetration in uncreased areas. |
| C | 2.7 | 23.5 | Along creases with considerable penetration in uncreased area. |
| D | 3.4 | 62.0 | Along creases with very few penetrations in uncreased area. |

Replacement of the ethylene/vinyl chloride interpolymer of composition D in tables II, III and IV with the interpolymers of examples 2 through 16 produces substantially the same excellent results.

While this invention has been described with respect to certain embodiments, it is not so limited and it is understood that variations and modifications thereof may be made without departing from the spirit of scope of this invention.

The embodiments of the invention in which an exclusive property or privilege is claimed are defined as follows:

1. A coated fibrous substrate having improved oil, grease, and solvent comprising a fibrous substrate coated with a film consisting essentially of starch and an interpolymer selected from the group consisting of (a) an interpolymer containing from about 5 to 70 percent ethylene, from about 30 to about 95 percent vinyl chloride, and from about 0.1 to about 10 percent of at least one other polar monomer including at least about 0.1 percent to about 10 percent of acrylamide, any remainder of said polar monomer content being selected from the group consisting of acrylonitrile, N-(alkyl) acrylamide having from one to three carbon atoms in said alkyl groups, methacrylamide, N-(alkyl) methacrylamide having from one to three carbon atoms in said alkyl groups, N-methylol acrylamide, N[2-(2-methyl-4-oxopentyl)] acrylamide, acrylic acid, methacrylic acid and alkali metal and ammonium salts of acrylic and methacrylic acids, maleic acid, fumaric acid, half and complete alkali metal and ammonium slats of maleic and fumaric acid, aconitic acid, itaconic acid and citraconic acid, and alkali metal and ammonium salts thereof, half alkyl esters of maleic, fumaric, itaconic, and citraconic acids having from one to six carbon atoms in said alkyl groups, acrylyl and methacrylyl esters of hydroxyalkanoic acids having from two to six carbon atoms in said alkanoic acids, acrylylamide and methacrylylamides of aminoalkanoic acids having from two to six carbon atoms in said aminoalkanoic acid, hydroxyethyl and hydroxypropyl esters of acrylic, methacrylic, maleic, and fumaric acids, vinyl esters of alkanoic acids having from one to six carbon atoms and alkyl sulfonic acid having from one to six carbon atoms, phenylsulfonic acids, and acrylyl and methacrylyl esters of hydroxyalkylsulfonic acid having from one to six carbon atoms in said alkyl moieties, and hydroxyalkylsulfonamides having from one to six carbon atoms in said hydroxyalkyl moieties; and (b) interpolymers of the type described in (a) treated with an acid or a base having an ionization constant higher than about $10^{-4}$ in amounts equivated to up to about 100 percent of the amide content of said interpolymer.

2. A fibrous substrate in accordance with claim 1 wherein the interpolymer is a terpolymer containing from about 5 to 0 percent ethylene, from about 30 to 95 percent vinyl chloride and from about 0.1 to 10 percent acrylamide.

3. A fibrous substrate in accordance with claim 1 wherein the substrate is coated with about 0.5 to about 150 pounds of the starch/interpolymer composition on one side per each 3,000 square feet of substrate.

4. A fibrous substrate in accordance with claim 1 wherein the substrate is coated with about 1 to about 20 pounds of the starch/interpolymer composition on one side per each 3,000 square feet of substrate.

5. A fibrous substrate in accordance with claim 1 wherein the substrate is coated with about 1 to about 5 pounds of the starch/interpolymer composition on one side per each 3,000 square feet of substrate.

6. A fibrous substrate as described in claim 1 wherein the interpolymer is a terpolymer containing about 19 to 23 percent ethylene, about 74 to 78 percent vinyl chloride, and from about 2 to 4 percent acrylamide in aqueous dispersion treated with sodium hydroxide in an amount stoichiometrically equivalent to about 10 to 100 percent of the amide group content of said terpolymer.

7. A coated fibrous substrate in accordance with claim 1 wherein the substrate is paper.

8. A coated fibrous substrate in accordance with claim 1 wherein the substrate is paperboard.

9. A coated fibrous substrate in accordance with claim 1 wherein the substrate is glassine.

10. A coated fibrous substrate in accordance with claim 1 wherein the substrate is parchment.

UNITED STATES PATENT OFFICE

CERTIFICATE OF CORRECTION

PO-1050 (5/69)

Patent No. 3,632,425          Dated January 4, 1972

Inventor(s) Paul R. Graham and August F. Ottinger

It is certified that error appears in the above-identified patent and that said Letters Patent are hereby corrected as shown below:

In column 5, claim 1, line 63, "resistance" should be inserted after the word "solvent".

In column 6, claim 1, in line 8, "slats" should read "salts". In column 6, line 37, $10^4$ should read "$10^{-4}$".

In column 6, claim 2, line 42, "5 to 0" should read "5 to 70".

Signed and sealed this 1st day of August 1972.

(SEAL)
Attest:

EDWARD M. FLETCHER, JR.          ROBERT GOTTSCHALK
Attesting Officer                Commissioner of Patents